July 18, 1950      H. H. CURRY      2,515,495
SELF-SYNCHRONOUS SYSTEM

Filed Jan. 30, 1945      4 Sheets-Sheet 1

Inventor
HERMAN H. CURRY
By Murray O. Hayes
Attorney

July 18, 1950     H. H. CURRY     2,515,495
SELF-SYNCHRONOUS SYSTEM
Filed Jan. 30, 1945     4 Sheets-Sheet 2

Inventor
HERMAN H. CURRY
By Murray O. Hayes
Attorney

HERMAN H. CURRY

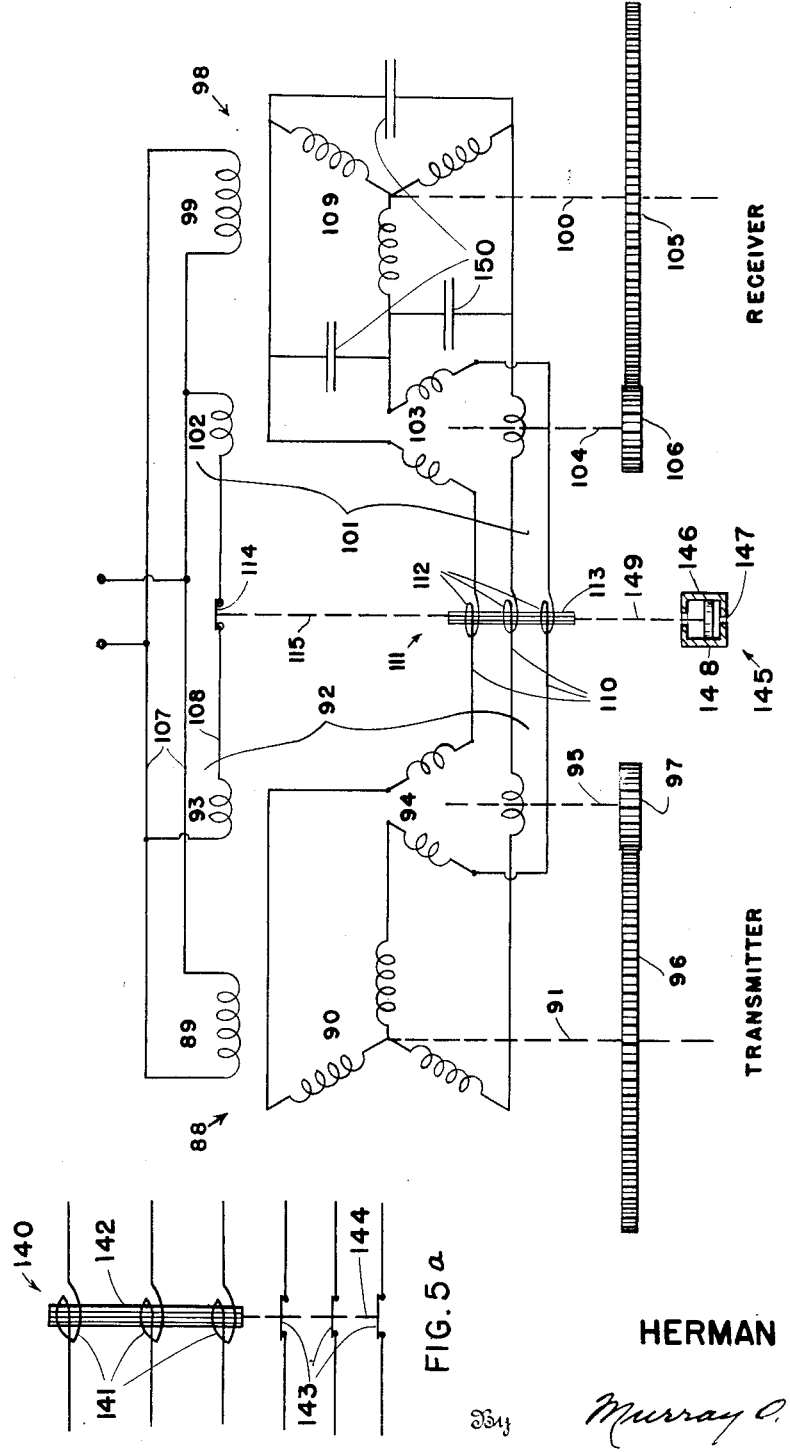

Patented July 18, 1950

2,515,495

UNITED STATES PATENT OFFICE 2,515,495

SELF-SYNCHRONOUS SYSTEM

Herman H. Curry, United States Coast Guard

Application January 30, 1945, Serial No. 575,318

31 Claims. (Cl. 318—24)

(Granted under the act of March 3, 1883, as amended April 30, 1928; 370 O. G. 757)

This invention relates to improvements in electrical machines of the kind used in self-synchronous systems designed to reproduce angular motion at a distance.

More specifically, the invention contemplates improving the torque characteristics of self-synchronous machines to increase the sensitivity of systems using such machines, particularly when the angular displacement between the rotors of the transmitter and receiver is relatively small.

Self-synchronous systems, used in fire-control equipment, gyroscopic compass repeaters and similar applications, are sometimes referred to as syncro-tie or Selsyn apparatus and, as indicated, are for transmitting angles. Where the equipment is required to be self-synchronizing after power failure, single-speed units are required. Greater accuracy can be obtained by using multiple-speed units, but only at the loss of the self-synchronous feature. In the usual application, greater accuracy is desirable and, as the error is a function of the air-gap torque required of the apparatus, which in most cases is only friction, a rapid increase of torque with the angle of deflection is more desirable than a high maximum torque at large angles of deflection.

An object of this invention is to combine the operating characteristics of several electrical machines to produce a desired resultant operating characteristic.

Another object is to combine torques of self-synchronous machines of different characteristics to produce a desired resultant torque.

Another object is to increase the sensitivity of self-synchronous systems.

Another object is to increase the torque of the receiver in a self-synchronous system for small angular displacement of the generator.

Another object is to provide a self-synchronous machine of high torque close to the point where the generator and receiver are in phase thereby increasing the sensitivity of the system using such machines.

Another object is to increase the sensitivity of self-synchronous systems by using a plurality of interconnected two-pole machines in both the transmitter and the receiver.

Figure 5:
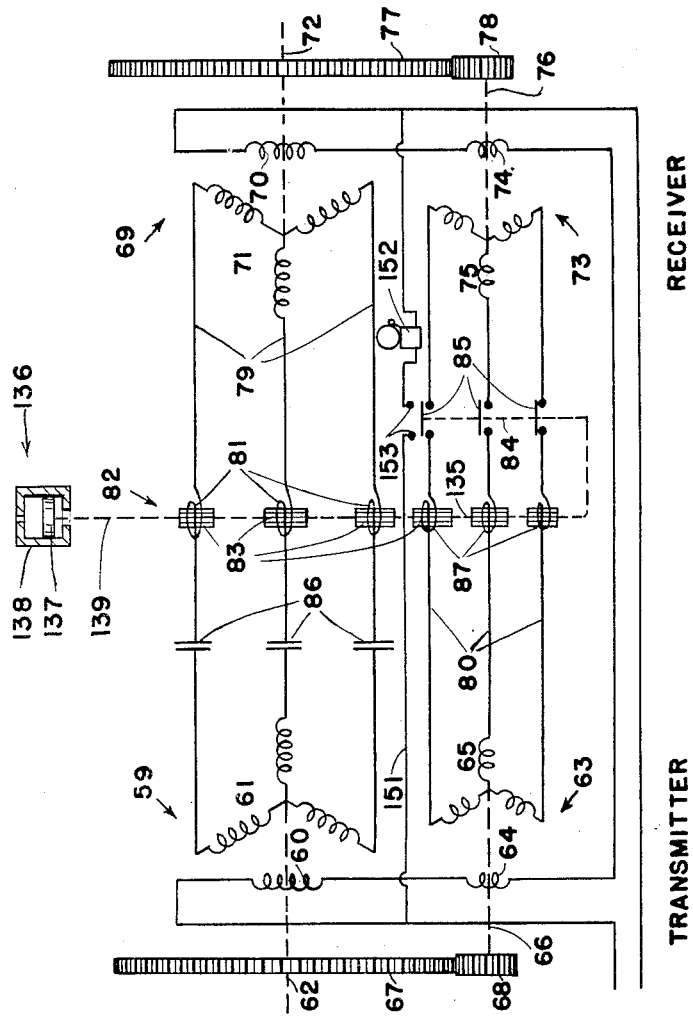
Figure 1:
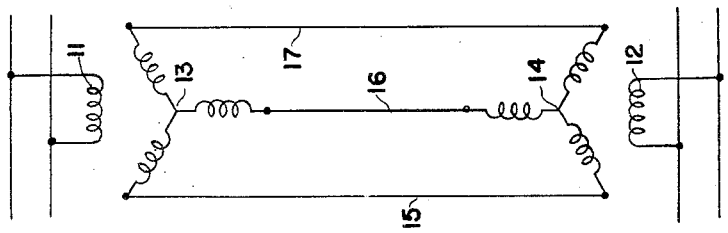
Figure 4:
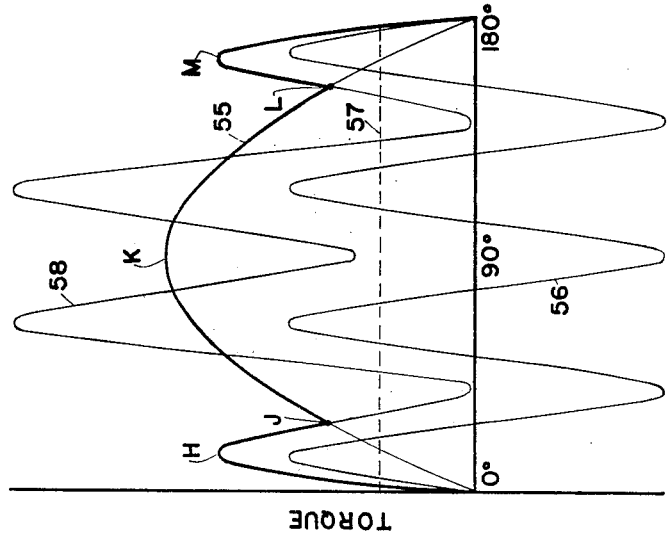
Figure 2:
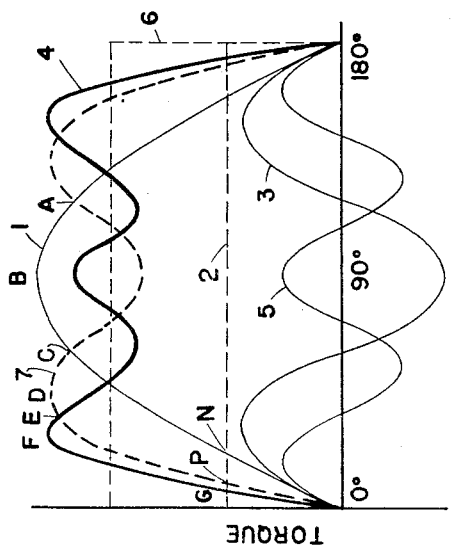
Figure 3:
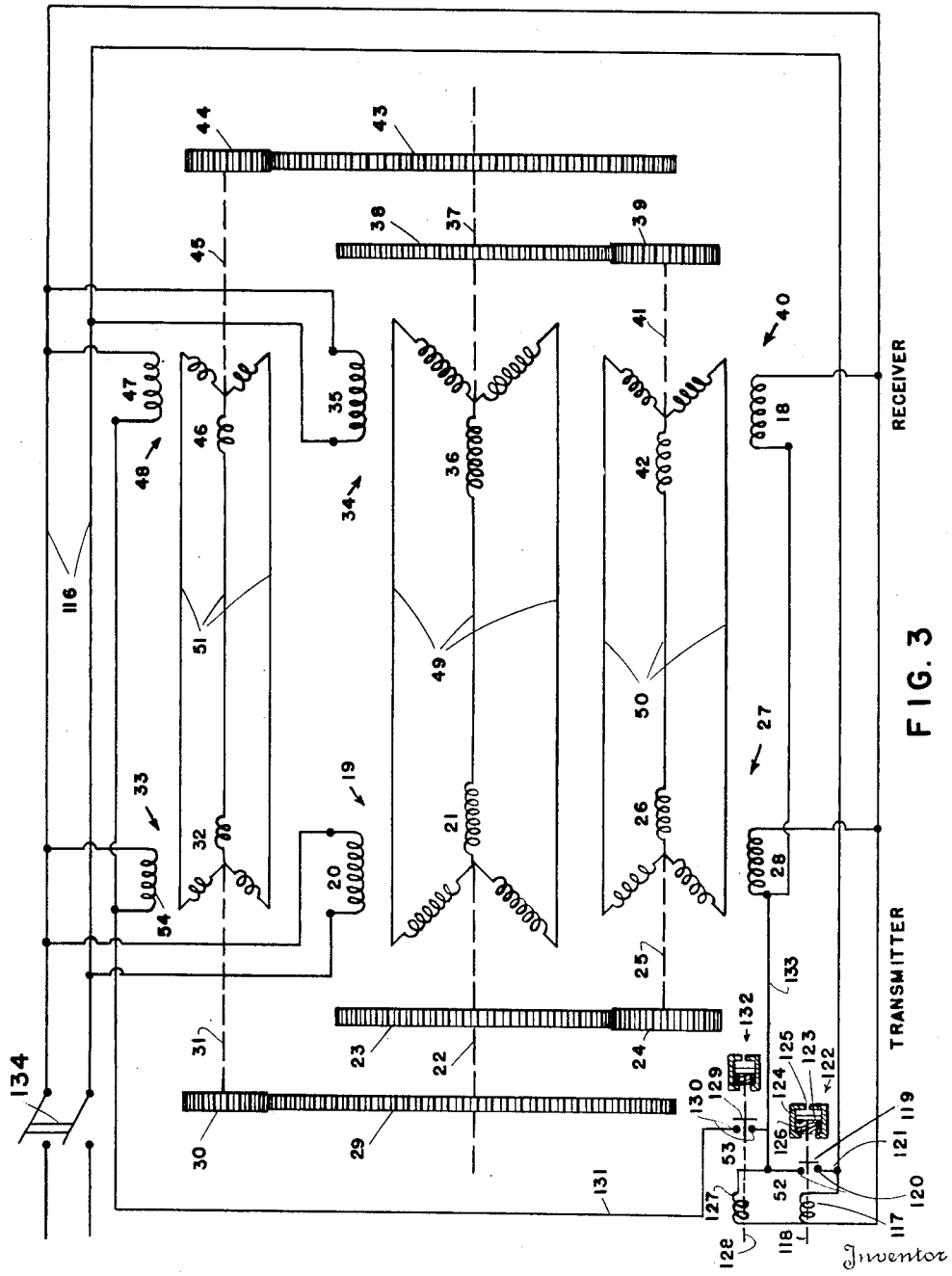

Fig. 1 is a diagrammatical illustration of a conventional self-synchronous system; Fig. 2 is a chart of several torque curves illustrative of the operation of the invention; Fig. 3 is a diagrammatical illustration of an embodiment of the invention using several two-pole machines in both the transmitter and receiver; Fig. 4 is a chart of two torque curves, one of which is for a high torque two-pole septuple speed motor, illustrative of the operation of a modification of the invention; Fig. 5 is a diagrammatical illustration of a modified form of the invention; Fig. 5a is a diagrammatical illustration of a modified form of relay which may be used in the system shown in Fig. 5; Fig. 6 is a diagrammatical illustration of a further modification.

Self-synchronous systems usually comprise two machines, one designated as a generator and the other, which repeats any movement thereof, as a receiver. As shown in Fig. 1 the machines may have single-phase stator or primary windings 11, 12 connected to a common single-phase source of alternating current electric power with the rotors 13, 14 carrying three-phase rotor or secondary windings which are electrically connected by suitable conductors 15, 16, 17. Or the stators may have three-phase secondary windings which are electrically connected, while single-phase primary windings on the rotors are connected to a source of single-phase electric power. Or both rotors and stators may carry three-phase windings. When, in any case, the windings are properly phased out the rotors remain stationary in the same angular relation to their respective stators. The voltages in the connected windings are then equal and opposite and no current flows therebetween. However, if one rotor is displaced in space phase, a resultant voltage becomes available for circulating a current through the connected windings which will produce a torque in the receiver tending to turn the rotor thereof to a position corresponding to the new position of the generator rotor, the two rotors thus tending to move in synchronism. The torque developed in the receiver tending to turn the rotor to the angular position assumed by the generator rotor varies in magnitude with the angle of displacement between said rotors. When the displacement between the rotors is small, the restoring torque developed in the receiver is small and when the displacement is large, the torque is large.

The torque developed in the receiver, or that required to turn the generator, of a two-pole system varies approximately sinusoidally between zero and 180° of angular displacement of the rotors. Curve 1 of Fig. 2 is the torque characteristic of a two-pole machine. Torque developed at displacement approaching 0° and 180° is relatively low. If the friction in the receiver is such that a torque represented by line 2 must be developed in the receiver before it can rotate there will be no movement of the receiver for approximately the first 22° of angular movement of the generator, rendering the system relatively insensitive. The optimum torque curve for a self-synchronous machine would be one that has high torque at low values of displacement such as the rectangular curve 6, which would cause the receiver rotor to turn at the slightest displacement between the rotors of the system.

According to the invention, improvement of the torque characteristic of a self-synchronous system is obtained by the use of two or more self-synchronous systems of conventional design whose generator rotors and receiver rotors are coupled in a manner whereby the torque developed in one system is added to the torque developed in the other system. In this case, each system comprises only two-pole generators and receivers coupled by means of suitable gearing in a manner to increase the net torque at low angles of rotor displacement.

If a two-pole machine operates at a greater speed than that of the unit-speed two-pole machine, it will produce a series of torque fluctuations, curves 3 or 5 of Fig. 2, for each half torque fluctuation, curve 1, of the first machine. If these torques are applied to one shaft, the resultant torque will be the sum of the two. That is to say, the multispeed machine will add to, or subtract from, the torque of the single-speed machine. If the unit-speed machines and the multispeed machines are in synchronism when the corresponding machines are mechanically coupled together, the resultant torque will be increased at low angles of rotor displacement as shown by curve 4 which is the net torque produced by curves 1, 3 and 5 for rotor displacements of from 0° to 180°.

However, in order that the device function properly, the resultant torque curve 4 must be symmetrical about the 180° axis. That is to say, the resultant torque curve for 180° to 360° must be similar to that shown for 0° to 180°, Fig. 2, but inverted. The shape of torque curves of two-pole machines of the kind here considered are approximately sinusoidal. However, as only sine waves comprising the fundamental and odd harmonics will combine to form a resultant curve symmetrical about its 180° axis, it is necessary to select only those multispeed machines whose torque curves meet this necessary requirement.

For example in Fig. 2, the torque characteristics 3 and 5 are those of triple-speed and quintuple-speed two-pole machines, so connected to the unit-speed machine that they make three and five revolutions respectively for each revolution of the unit-speed machine. Thus the selection of multispeed machines of some odd number of speeds compared with the unit-speed machine will, properly coupled, produce a net torque characteristic that will be symmetrical about the 180° axis. This coupling, to produce a resultant torque characteristic of the desired form, requires that the machines be coupled when they are in space phase or synchronism. That is to say, when the unit-speed machines are synchronized so that no synchronizing torque is developed in the unit-speed motor, the multispeed machines must be similarly synchronized so that no torque is developed in the motors thereof. In order to produce a resultant torque characteristic which approximates the optimum rectangular curve, and to insure self-synchronism in the system, the maximum value of the torque contributed by the multispeed machines is considerably less than that of the unit-speed machine, the desirable maximum torque of the three-speed and five-speed machines applied to the shaft of the unit-speed device being one-third and one-fifth, respectively, that of the unit-speed machine. The summation of the several machines produces the resultant torque characteristic 4. It will be seen that this resultant torque will equal the frictional torque at approximately 6° of angular displacement of the rotors as compared with 22° for the unit-speed machine.

Fig. 3 illustrates a preferred means for coupling the multispeed machines to the unit-speed machines. The transmitter and receiver each comprise several two-pole machines so geared together that they operate as a unit. The main shaft carries the unit-speed machine and the multispeed machines are coupled to this shaft through suitable gearing whereby the net effect is that of the several machines. Each machine comprises a primary or stator winding connected to a common source of single-phase electric power and a secondary or rotor winding mounted on a shaft. The secondary windings of corresponding machines in the transmitter and receiver are electrically connected.

The transmitter comprises a two-pole unit-speed self-synchronous generator 19 with a single-phase primary winding 20 and a three-phase Y-connected secondary winding 21 fixedly connected to a main shaft 22. This shaft has a gear 23 affixed thereto which meshes with a gear 24 fixedly mounted on a shaft 25 which also carries the three-phase secondary winding 26 of a two-pole generator 27. A single-phase winding 28 comprises the primary of this generator. The gears 23 and 24 are in the ratio of one to three, so that when gear 23 is turned once, gear 24 rotates three times. Shaft 22 also carries another gear 29 which in turn meshes with a gear 30 affixed to shaft 31 which also carries the three-phase secondary 32 of a quintuple-speed machine 33. The gears 29 and 30 are in the ratio of 1 to 5 so that one revolution of gear 29 produces five revolutions of gear 30. Thus it will be seen that for one revolution of the unit-speed generator 21, the triple-speed generator 27 will rotate three times and the quintuple-speed generator 33 will rotate five times.

The receiver is substantially a duplicate of the generator and comprises a unit-speed motor 34 having a single-phase primary winding 35 and a three-phase Y-connected secondary winding 36 coupled to a shaft 37. This shaft has a gear 38 affixed thereto which meshes with gear 39 driven by the triple-speed motor 40 through shaft 41 coupled to the three-phase secondary winding 42 of the motor 40. The primary winding comprises a coil 18. The gears 38 and 39 are in the ratio of one to three so that three revolutions of the motor 40 correspond to one revolution of the shaft 37. The shaft 37 also has affixed thereto a gear 43 driven by gear 44 coupled to shaft 45 which is connected to the three-phase secondary winding 46 of the quintuple-speed motor 48.

The secondary windings of the corresponding machines comprising the transmitter and receiver are electrically connected by means of suitable conductors 49, 50 and 51. As the multispeed machines are connected to the shaft of the unit-speed machine by gearing, it follows that the maximum value of torque required to drive those serving as generators 27 and 33 and to produce the maximum value of torque in those serving as motors 40 and 48, need be only ⅑ and ¹⁄₂₅ respectively of the rating of the unit-speed machine. For example, if the maximum torque to be applied by motor 40 to the shaft 37 is to be ⅓ of the maximum torque developed by the unit-speed machine 34, the 1 to 3 gear ratio will make the maximum torque developed by motor 40 only ⅕ of that of the unit-speed device. The several generators comprising the transmitter and the motors comprising the receiver are geared together when the corresponding machines are in synchronism. That is to say, when the unit-speed machines are in synchronism, the multispeed machines are also in synchronism. Under these conditions no torque is developed in the motors and the system is at rest and the rotors are in space phase.

In operation, any movement of the transmitter shaft 22 will cause rotation of the secondary 21 of the generator 19, three times as much rotation of the secondary 26 of the generator 27 and five times as much rotation of the secondary 32 of the generator 33. Any angular displacement between the rotors of the transmitter and receiver unbalances the equilibrium of the electrical circuits in the corresponding secondaries, causing a current to flow from the several generator windings to the corresponding windings in the motors developing a torque therein tending to cause the motors to assume the same angular position taken by the generator rotors. As the multispeed secondaries are geared to the shaft, the total torque developed is the sum of the torques developed in the several machines, due allowance being made for the effect of the gearing.

Curve 1 of Fig. 2 shows the torque developed in the unit speed motor 34 for 180° displacement between rotors. Curves 3 and 5 show the torques delivered to the shaft 37 by the triple-speed and quintuple machines during a 180° displacement of the unit-speed machine. The sum of these torques for any given angular displacement is the net or effective torque delivered by shaft 37 and is represented by curve 4 which shows the increase in torque for low angles of rotor displacement.

While Fig. 3 shows the use of two multispeed machines, it is obvious that only one may be used, or that more than two may be used depending on the torque desired at low angles of rotor displacement. The torque of the unit-speed machine dominates that of the multispeed machines in order that the resultant torque be maintained at a value higher than the frictional torque of the machine throughout the maximum angular movement thereof and that system may be reliably self-synchronizing.

When the power is off it is possible that the rotors of the transmitter and receiver may be considerably displaced with respect to each other, due to manual manipulation or vibration. When so displaced, the torque developed by the unit-speed device may exceed that produced by the combination of unit-speed and multispeed devices as shown in Fig. 2. Thus, for large rotor displacements, it would be desirable to delay operation of the multispeed machines until after the unit-speed machines have exerted their torque throughout that range of angular displacement wherein the torque produced thereby exceeds the resultant torque developed by all the machines. That is to say, operation of the multispeed machines is delayed upon energization of the system until after the unit-speed machines have operated together to obtain approximate synchronism, after which energization of the multispeed machines will produce the additional torque necessary to pull the motor rotors into more exact synchronism with those of the generators.

The means for delaying energization and operation of the multispeed machines comprise a pair of automatically operated delayed-action switches in the primary circuits of the multispeed machines as shown in Fig. 3. Power is supplied to the primary windings through a single-phase line 116 containing a master switch 134. Primary windings 20 and 35 of the unit-speed machines are directly coupled to the line 116. The automatic switch 52 for energizing the primaries 28 and 18 of the triple-speed machines comprises a solenoid 117, a core 118 carrying a switch 119 which serves to bridge contacts 120 in conductor 121 which, with conductor 133, furnishes a connection to one end of each of the windings 28 and 18. The other ends of these windings are connected to the other side of the line 116. A dashpot 122 is connected to the switch 119 and comprises a piston 123 housed in a cylinder 124 provided with a bleed aperture 125. A spring 126, compressed during closing of the switch, serves to open the same when the solenoid 117 is deenergized. The bleed on the dashpot is adjusted to delay closing of the switch for some predetermined period, say one-half second. Other well-known equivalent apparatus may be used to give similar results.

Closing of switch 52 completes a circuit through the solenoid 127 of switch 53 which acts on its core 128 to move switch 129 to bridge contacts 130 in conductor 131 which is connected to one end of each primary windings 54 and 47 of the quintuple-speed machines 33 and 48. A dash pot 132, of the same construction as dash pot 122, is operatively connected to switch 129 to delay the energization of the primaries of the quintuple-speed machines for some predetermined period of time say one-half second. The other ends of windings 54 and 47 are connected to the other side of the power line 116 to complete the circuit.

Thus closing of switch 134 in the power line 116 will first energize primary windings 54 and 47 and the unit-speed machines will tend to synchronize. The automatic switch 52, energized at the same time, will then close to energize windings 28 and 18 after a short interval and the triple-speed machines will then contribute to the synchronizing of the system. When switch 52 closes, switch 53 is energized and will complete the circuit for the primary windings 54 and 47 after a suitable interval whereupon all three machines contribute to the synchronization of the system.

This sequence of operations is best understood by reference to Fig. 2 where curve 7 represents the sum of curves 1 and 3 only and represents the resultant torque of the unit-speed machine and the triple-speed machine only. The switches 52 and 53 are closed after the period of operation of the unit-speed machine represented by the portion A, B, C of the curve 1. When the displacement of the rotors corresponds to that of point C, the switch 52 is closed to energize the primaries 28 and 42 of the triple-speed machines 27 and 42 whereupon the resultant torque of this machine and the unit-speed machine will be represented by that portion of the curve C, D, E. Upon reduction of the angular displacement to the degree corresponding to point E on the curve, the switch 53 operates to energize the primaries 47 and 54 of the quintuple-speed machine 33 and 48; whereupon the combined torque will be that represented by that portion of the resultant curve marked E, F, G. Thus the torque characteristic of the system operated with a delay in time in the operation of the switches in the primary circuits of the multispeed machines for an angular displacement of 90° of the unit-speed machines approaches that represented by the curve B, C, D, E, F, G which shows that a higher torque is obtained throughout a considerable range of rotor displacement than is the case where the multispeed machines are always energized. The torque for angular displacements of the unit-speed rotor of from 45° to 90° is about 20% greater than when no time delay is introduced in energizing the multispeed machines.

The time delay in the operation of the switches is not a function of the angle of displacement of the rotors, but is an arbitrary period selected to approximate closely the period of time required for the rotors to come into a degree of synchronism where the addition of the torque of the multispeed machines is most desirable. In the description in the previous paragraph it was assumed that the timing of the switches was such as to produce the optimum results. However, the system will operate as well even though the timing of the switches does not exactly coincide with the period of time necessary to produce a change in the rotor displacement corresponding to points C and E of the curves of Fig. 2. For example, the system may reach approximate synchronism before switches 52 and 53 are closed, say at a point corresponding to the intersection N of the curves 1 and 2. Closing of the switch 52 will then energize the triple-speed machines producing a torque which in combination with that produced by the unit-speed machines will synchronize the transmitter and receiver to a point corresponding to the intersection P of the curves 2 and 7. Closing the switch 53 then energizes the quintuple-speed machines which adds their torque to that of the other machines to synchronize the system to a point corresponding to point G, the intersection of curves 2 and 4.

Where means are provided for energizing the multispeed machines for small angles of rotor displacement only, the torque of the multispeed machines can be greatly increased with a correresponding increase in torque for small displacement. It also permits the use of one large multispeed machine rather than two or more smaller machines with a corresponding simplification of the system. Fig. 4 shows the torque characteristics of machines designed to operate in this manner. Curve 55 is the torque characteristic of a unit-speed two-pole machine, while curve 56 is the characteristic of a septuple speed two-pole machine coupled to the unit-speed machine through suitable gearing. The broken line 57 represents the torque required to overcome the friction in the machine and its magnitude is exaggerated for purposes of illustration. The maximum value of the septuple speed machine is so large that when combined with the unit-speed torque, the resultant torque, curve 58, is lower than the frictional torque for certain angles of rotor displacement, rendering the system insensitive to angles of displacement between 30° and 45°. However, when the septuple speed machine is energized for small angles of rotor displacement only, advantage may be taken of the high torque of the multispeed machine at such angles. In the diagram, the combined torque of the unit-speed and septuple speed machines would be equal to the frictional torque at about 4° of rotor displacement as against 18° if only the unit-speed machine were used.

The fact that the current circulated in the conductors connecting the secondaries increases with the angle of displacement between the rotors can be utilized to operate switches in the conductors connecting the secondaries of the multispeed machines to cut automatically the multispeed machines in and out of the system when the displacement between the unit-speed rotors reaches some predetermined angle.

Fig. 5 illustrates a self-synchronous system incorporating such automatic means. The transmitter comprises a unit-speed two-pole generator 59 having a primary winding 60 and a three-phase Y-connected secondary winding 61 affixed to a shaft 62. A septuple speed two-pole generator 63 has a primary winding 64 and a three-phase Y-connected secondary winding 65 which is affixed to a shaft 66. The two generators are geared together by gears 67 and 68 affixed to shafts 62 and 66, respectively. The gear ratio is 1 to 7, so that any angular movement of the generator rotor 61, causes a sevenfold angular movement of generator rotor 65. The receiver is similarly constructed, having a unit-speed two-pole motor 69 with a single-phase primary 70 and three-phase secondary 71 affixed to shaft 72 and a multispeed motor 73 having a primary 74 and a three-phase secondary 75 affixed to shaft 76. Gears 77 and 78, affixed to shafts 72 and 76, respectively, cause the motor 73 to rotate seven times for each rotation of motor 69. The machines comprising the receiver, as well as those comprising the transmitter, are coupled together in selected space phase relation. That is, the machines are coupled together when both the unit-speed machines and the multispeed machines are in synchronism. The primaries of the several machines are connected in series and are supplied with single-phase alternating current from a common source.

The secondaries 61 and 71 of the unit-speed machines are electrically connected by conductors 79, while the secondaries 65 and 75 of the multispeed machines are similarly connected by conductors 80. A relay 82 comprises three coils 81, one in each of the conductors 79, and three coils 87 similarly placed in conductors 80. Iron cores 83, one each of which is positioned in coils 81 and 87, are rigidly connected by a member 135 to move in unison for the purpose of actuating the switches 85 by means of an arm 84 attached to the cores and carrying said switches. The switches 85 are located in the conductors 80 connecting the secondaries of the multispeed machines. A dashpot 136 dampens the movement of the relay. It comprises a piston 137, connected to the cores by a rod 139, mounted in a cylinder 138 provided with a bleed to regulate the rate of movement thereof.

Means for giving an alarm upon displacement of the system by an amount sufficient to energize the relay 82 to open switches 85 is provided and comprises a conductor 151 connected across the line which supplies alternating current to the stator winding of the several machines having an alarm connected therein, shown as a bell 152. A pair of contacts 153 in the line are adapted to be closed by one of the switch blades 85 when the relay 82 operates to deenergize the multispeed machine.

The force exerted by coils 81 on the core 83 is sufficient to hold the switches 85 in open position but insufficient alone to move the switch. The combined force of the coils 81 and 87 is sufficient to actuate the switch which once opened is held so by coils 81 until the current in conductors 79 drops to a value permitting the switch to close. The relay 82 is designed to open the secondary circuit of the multispeed machines when the currents in the secondary conductors 79 and 80 of the several machines are of a value corresponding to the torque of the unit-speed machine equal to or greater than, the resultant torque of the combined machines. That is to say, as the current in the secondaries increases with an increase in angular displacement between the rotors, the relay 82 is designed to open the secondary circuit of the multispeed machine whenever the displacement angle exceeds that for which the torque of the single-speed machine alone exceeds that of both machines together. For example, if the torque characteristics shown in Fig. 4 are those of the machines shown in Fig. 5, the relay 82 would deenergize the multispeed machines whenever the angular displacement of the rotors is between about 26° and 154° indicated as J and L, the points of intersection of the resultant torque curve 58 and the torque curve 55 of the unit-speed motor 69. The torque developed by the receivers would then correspond to the composite heavy line curve H, J, K, L, M.

While the relay has been shown actuated by current in the unit-speed secondaries, the relay could, of course, be actuated by the current in the primary circuits as the current therein also increases in proportion to the rotor displacement. It is also obvious that for some applications it will be preferable to operate the relay as a function of single-speed unit primary or secondary current only. Such a modified form of relay which can be substituted for the relay 82 of Fig. 5 is shown in Fig. 5a. This relay 140 comprises coils 141, one of which is inserted in each of the conductors connecting the secondaries of the unit-speed machine. These coils act on an iron core 142 mounted for movement therein. Switches 143 in the conductors connecting the secondaries of the multispeed machines are operatively connected to a rod 144 affixed to core 142. The relay 140 is designed to open the switches 143 to deenergize the multispeed machine when the rotor displacement is such that the torque produced by the unit-speed machine exceeds that produced by the combined torque produced by both the unit-speed and multispeed machines. If Fig. 4 represents the torque curves of the machines, the relay 140 closes switches 143 whenever the angular displacement of the system becomes less than that indicated by the point J or greater than that indicated by point L. Thus for rotor displacements corresponding to that between points J and L of Fig. 4, only the unit-speed machine will be energized.

The leakage reactance of the secondary circuits together with the reactance of relay coils 81 introduces considerable inductive reactance in the system with a correspondingly lag in the current in the secondary circuits. As it is only that component of the current in the secondary windings in phase with the air gap flux from the primary winding that produces torque, the addition of a capacitive reactance to the secondary circuits to reduce the impedance and to bring the current therein into phase with the voltage or flux in the primary circuit will increase the torque developed. This capacitance may be of a magnitude necessary to produce resonance in the secondary circuit. The condensers 86, Fig. 5, are shown inserted in the conductors 79 for this purpose.

Fig. 6 illustrates a modified form of the invention wherein the secondaries of the multispeed machines are connected in series with the secondaries of the unit-speed machines and the relay for deenergizing the multispeed machines operates a switch in the primary rather than the secondary circuit. The transmitter consists of a unit-speed two-pole generator 88 comprising a primary winding 89 and a three-phase Y-connected secondary or rotor winding 90 affixed to shaft 91. A septuple speed generator 92 has a primary winding 93 and a three-phase delta-connected secondary or rotor winding 94 affixed to a shaft 95. The two generators 88 and 92 are geared together by gears 96 and 97 affixed to the shafts 91 and 95. The gear ratio is 1 to 7, so that any angular movement of generator rotor 90 is increased sevenfold in generator rotor 94. The receiver is similarly constructed, having a unit-speed two-pole motor 98 with a primary winding 99 and a three phase Y-connected secondary or rotor winding 109 affixed to shaft 100. A multispeed motor 101 having a primary winding 102 and a three-phase delta-connected secondary or rotor winding 103 affixed to shaft 104. The motors 98 and 101 are coupled together by means of gears 105 and 106 whose ratio is 1 to 7. The multispeed and unit-speed machines are so geared together that when the unit-speed machines are synchronized the multispeed machines are also synchronized. The torque characteristics of the generators and motors are substantially the same as those shown in Fig. 4, the torque of the septuple speed machine having been increased in magnitude through the gearing.

The primary windings 89 and 99 are connected to a source of single-phase alternating current by means of conductors 107. Primary windings 93 and 102 are connected in series by means of conductor 108 and are similarly connected to the source of power. The Y-connected secondaries 90 and 109 are connected in series with the associated delta-connected secondary windings 94 and 103 of the multispeed machines. These delta-connected secondaries 94 and 103 are connected by means of conductors 110. Condensers 150 are connected across the terminals of the series connected unit-speed and multispeed secondaries 109 and 103, respectively, of the receiver to reduce the impedance of the circuit by neutralizing inductive reactance therein, thus increasing the current and bringing it more nearly into phase with the air gap magnetic flux whereby the torque developed in the receiver is increased. A relay 111 comprises coils 112 in each of the conductors 110 and an iron core 113 mounted for movement in said coils. A rod 115 connects the iron core with a switch 114 in the circuit of the primary windings 93 and 102 of the multispeed machines. A dashpot 145 serves to control the rate of movement of the relay. It comprises a cylinder 146, provided with a bleed 147, and a piston 148 operatively positioned therein and connected to the core 113 by a rod 149. Movement of the relay is limited by the rate at which the solenoid can move the piston which is in turn a function of the size of the bleed 147, adjustment of which enables the rate of operation of the relay to be varied. Relay 111 is designed to open switch 114 when the angular displacement of the rotors, with its corresponding current value, exceeds a small value thereby deenergizing the multispeed machines so that the unit-speed machines act alone.

While I have described the preferred forms of my invention I do not wish to limit myself to the precise details shown but wish to avail myself of such variations and modifications as may come within the scope of the appended claims.

The invention described herein may be manufactured and used by or for the Government of the United States of America for governmental purposes without the payment of any royalties thereon or therefor.

I claim:

1. A self-synchronous system comprising a pair of two pole machines, means electrically connecting said machines for synchronous operation, a second pair of two pole machines, means electrically connecting said second pair of machines for synchronous operation, and mechanical means coupling corresponding machines of said pairs to produce an odd number of rotations of one machine with respect to the other.

2. A self-synchronous system as claimed in claim 1 said pair of machines coupled for highest rotation being of less rating than said other pair of machines.

3. A self-synchronous system comprising a pair of two pole electrical machines having rotor and stator windings, means connecting said machines for synchronous operation, a second pair of two pole electrical machines having rotor and stator windings, means connecting said second pair of machines for synchronous operation, and means coupling one machine of one of said pairs to one machine of the other of said pairs and means coupling the other machine of said one pair to the other machine of the other pair and adapted to produce an odd number of revolutions of said second pair of machines for each revolution of said first machines.

4. A self-synchronous system comprising a pair of two pole electrical machines having rotor and stator windings, means connecting said machines electrically for synchronous operation, a second pair of two pole electrical machines having rotor and stator windings, means connecting said second pair of machines electrically for synchronous operation, and means coupling one machine of one of said pairs to one machine of the other of said pairs and means coupling the other machine of said one pair to the other machine of the other pair and adapted to make the angular displacement of said second pair of machines some odd multiple of the angular displacement of said first pair of machines.

5. A self-synchronous system as claimed in claim 4, the said second pair of machines being of less rating than said first mentioned pair of machines.

6. A self-synchronous system comprising a transmitter and a receiver, each thereof comprising a two pole unit speed machine and a two pole multispeed machine, single phase primary windings and three phase secondary windings for each of said machines, means coupling said machines to make the angular displacement of said multispeed machine an odd multiple of the displacement of the said unit speed machine, means connecting the secondaries of the corresponding machines of said transmitter and receiver for synchronous operation, and a source of alternating current to energize said primary windings.

7. A self-synchronous system as claimed in claim 6, signal means and means for operating said signal means when the angular displacement of said transmitter and receiver exceeds a predetermined value.

8. A self-synchronous system as claimed in claim 6 and means to delay energization of said multiple speed machines.

9. A self-synchronous system as claimed in claim 6, circuit breaking means in said means connecting the secondary windings of said multispeed machines, and means in said means connecting said secondary windings of said unit-speed and multispeed machines for operating said circuit breaking means when the current therein reaches a predetermined value.

10. A self-synchronous system as claimed in claim 6, and means for deenergizing the multispeed machines at predetermined displacement of said secondary windings.

11. A self-synchronous system as claimed in claim 6, and means responsive to a predetermined value of current in said means connecting said secondary windings for rendering said multispeed machines inoperative.

12. A self-synchronous system comprising a transmitter and receiver, each thereof comprising a two-pole unit-speed machine having a three-phase Y-connected secondary winding and a two-pole multispeed machine having a three phase secondary winding, said secondary windings being connected in series, with said Y-connected secondary winding, and means coupling said secondary windings to make the angular displacement of the multispeed secondary winding some odd multiple of the angular displacement of the said unit-speed secondary winding and electrical connections between the secondary windings of said transmitter and said receiver.

13. A self-synchronous system as claimed in claim 12 and means for deenergizing the multispeed machines when the current in said electrical connections reaches a predetermined value.

14. A self-synchronous system as claimed in claim 12, and means in said conductors for actuating switch means to deenergize said multispeed machines when the current in said electrical connections reaches a predetermined value.

15. A self-synchronous system comprising a transmitter and a receiver, each thereof comprising a two pole electric machine having a rotor and a stator, windings on said rotor and stator, additional two pole machines of lesser rating than the first mentioned machine and having rotor and stator windings, gearing coupling said additional rotors to said first mentioned rotor to increase the angular displacement of said additional rotors an odd number of times with respect to the first mentioned rotor and electrical connections between corresponding machines of the transmitter and receiver to produce synchronous operation therebetween.

16. A self-synchronous system comprising a transmitter and a receiver, each thereof comprising a two pole machine having a wound rotor, a second two pole machine having a wound rotor, means coupling said machines to rotate one thereof an odd number of times for each revolution of the other, and electrical connections between corresponding machines of the transmitter and receiver to produce synchronous operation therebetween, said machines being coupled in selected space phase relation.

17. Means for maintaining two shafts in the same relative angular position comprising a first self-synchronous system having a generator and a motor, a second self-synchronous system having a generator and a motor, means coupling the said generators and means coupling the said motors, both of said means causing an angular movement of said generator and said motor of said second system to be an odd multiple of the angular movement of the said generator and motor of said first system.

18. The combination as in claim 17, further characterized by signal means, and means for operating said signal means when the angular displacement of said generator and motor exceeds a predetermined value.

19. A self-synchronous system comprising pair of machines electrically connected for synchronous operation, at least one additional pair of machines electrically connected for synchronous operation, means coupling the corresponding machines of each pair to produce a different degree of rotation between the machines of each pair, and means for deenergizing one of said pairs of machines when the angular displacement between the machines of one pair exceeds a predetermined value.

20. A self-synchronous system as claimed in claim 19, said means for deenergizing comprising a relay energized by the current between the secondary windings of the first-mentioned pair of machines in said system.

21. A self-synchronous system comprising a pair of unit-speed two-pole machines, a pair of multispeed two-pole machines, electrical connections between corresponding machines of said pairs to provide synchronous operation therebetween, and gearing connecting corresponding machines of said pairs, the gear ratio being an odd number.

22. A self-synchronous system comprising a transmitter and a receiver each comprising a two-pole electrodynamic machine and at least one torque-adding two-pole machine, means coupling said machines in said transmitter, means coupling said machines in said receiver, said coupling means being adapted to make the angular displacement of said torque-adding machines an odd multiple of the angular displacement of said first machines, and electrical connections between the machines of said transmitter and receiver and adapted to produce synchronous operations therebetween.

23. A combination of at least two self-synchronous systems, each of said systems comprising a transmitting machine and a receiving machine, and means for coupling corresponding machines of said systems, said coupling being such as to make the ratio between the angular displacements of said systems substantially an odd integer.

24. An apparatus for combining torques of unit- and multispeed machines to produce a resultant torque characterized by high torque-values at low angular displacement, said apparatus comprising, a first two-pole self-synchronous system having a transmitter and a receiver each including relatively movable parts, a second two-pole self-synchronous system having a transmitter and a receiver each including relatively movable parts, means electrically connecting corresponding parts of the transmitter and receiver of said first and said second systems, first means mechanically coupling the movable parts of said transmitters, and second means mechanically coupling the movable parts of said receivers, said first and second mechanical coupling means being adapted to render the motion of one of said movable parts substantially equal to an odd multiple of the motion of the other of said movable parts.

25. The apparatus defined in claim 24 wherein said first system is a unit-speed machine and said second system is a multispeed system.

26. The apparatus defined in claim 24 wherein said first and second mechanical coupling means comprise gear mechanism having equal odd integral speed ratios.

27. A self-synchronous system comprising a pair of machines electrically connected for synchronous operation, at least one additional pair of machines electrically connected for synchronous operation, means coupling the corresponding machines of each pair to produce a different degree of rotation between the machines of each pair, and means for delaying the energization of said additional pairs of machines a predetermined period after energization of said first mentioned pair of machines.

28. The system according to claim 27, wherein said last-named means comprises delayed action switch means in the electrical connection of one of said pairs of machines.

29. A self-synchronous system, comprising a transmitter and a receiver, each thereof comprising a unit-speed machine and a multispeed machine, primary and secondary windings for each of said machines, means coupling said machines to make the angular displacement of said multispeed machine an odd multiple of the displacement of said unit-speed machine, means connecting the secondaries of the corresponding machines of said transmitter and receiver for synchronous operation, and a source of electrical energy to energize said primary windings.

30. A self-synchronous system, comprising a transmitter and a receiver, each thereof comprising a unit-speed machine having a three-phase secondary winding and a multispeed machine having a three-phase secondary winding, the corresponding secondary windings being connected in series, means coupling said secondary windings to make the angular displacement of the multispeed secondary winding an odd multiple of the angular displacement of the unit-speed secondary windings, and electrical connections between the secondary windings of said transmitter and said receiver.

31. A self-synchronous system, comprising a pair of machines connected for synchronous operation, at least one additional pair of machines connected for synchronous operation, and means coupling the corresponding machines of each pair to produce a different degree of rotation between the machines of each pair.

HERMAN H. CURRY.

REFERENCES CITED

The following references are of record in the file of this patent:

UNITED STATES PATENTS

| Number | Name | Date |
|---|---|---|
| 1,559,525 | Murphy et al. | Oct. 27, 1925 |
| 2,168,575 | Newell | Aug. 8, 1939 |
| 2,227,473 | Weathers | Jan. 7, 1941 |
| 2,300,334 | Bergmann | Oct. 27, 1942 |
| 2,309,163 | Bullock | Jan. 26, 1943 |

FOREIGN PATENTS

| Number | Country | Date |
|---|---|---|
| 373,253 | Italy | July 22, 1939 |

OTHER REFERENCES

"A Continuous-Control Servo System," Joseph T. McNaney, pp. 118–125 of Electronics, December 1944.

Certificate of Correction

Patent No. 2,515,495                                               July 18, 1950

HERMAN H. CURRY

It is hereby certified that error appears in the printed specification of the above numbered patent requiring correction as follows:

Column 14, line 1, for the word "machine" read *system*;

and that the said Letters Patent should be read as corrected above, so that the same may conform to the record of the case in the Patent Office.

Signed and sealed this 26th day of December, A. D. 1950.

[SEAL]

THOMAS F. MURPHY,
*Assistant Commissioner of Patents.*